United States Patent [19]
Mason

[11] Patent Number: 6,161,474
[45] Date of Patent: Dec. 19, 2000

[54] REMOVABLE END COVER FOR FOOD ROLLS

[76] Inventor: Marvin Gene Mason, 5912 Rainbow Springs Dr., Chattanooga, Tenn. 37416

[21] Appl. No.: 09/539,451

[22] Filed: Mar. 30, 2000

Related U.S. Application Data

[63] Continuation-in-part of application No. 09/215,104, Dec. 18, 1998, Pat. No. 6,044,757.

[51] Int. Cl.[7] .............................. A23B 4/32; A23N 15/00
[52] U.S. Cl. ............................ 99/645; 99/485; 99/646 R
[58] Field of Search ................................. 99/645, 646 R, 99/646 C, 485; 452/35, 39, 21, 22; 206/802; 426/135, 138, 132, 106, 115, 418–420; 138/103, 109

[56] References Cited

U.S. PATENT DOCUMENTS

| | | | |
|---|---|---|---|
| 170,223 | 9/1875 | Black | 99/645 |
| 787,021 | 4/1905 | Biber | 99/645 |
| 925,489 | 6/1909 | Lindsay | 99/645 |
| 1,011,862 | 12/1911 | Seitz . | |
| 1,013,244 | 1/1912 | Watson | 426/132 |
| 1,324,659 | 12/1919 | Gibson | 99/645 |
| 1,431,918 | 10/1922 | Arthur . | |
| 2,070,829 | 2/1937 | Everly | 99/645 |
| 2,598,789 | 10/1952 | Harrell | 99/645 |
| 2,622,760 | 12/1952 | Kissig | 99/645 |
| 2,716,066 | 6/1955 | Baker | 42/613 |
| 2,822,275 | 2/1958 | Schmidt . | |
| 2,943,944 | 7/1960 | Janus . | |
| 3,139,348 | 6/1964 | Reifers et al. | 426/132 |
| 3,556,390 | 1/1971 | Gould et al. . | |
| 4,007,761 | 2/1977 | Beckman . | |
| 4,061,785 | 12/1977 | Nishino et al. | 426/124 |
| 4,327,777 | 5/1982 | Michel et al. . | |
| 4,385,554 | 5/1983 | Daenen et al. | 99/645 |
| 4,777,054 | 10/1988 | Greenhouse | 426/115 |
| 5,215,495 | 6/1993 | Crevasse . | |
| 5,248,081 | 9/1993 | Hook . | |
| 5,273,482 | 12/1993 | Beckman et al. . | |

*Primary Examiner*—Timothy F. Simone
*Attorney, Agent, or Firm*—Alvin R. Wirthlin; Akin, Gump, Strauss, Hauer & Feld, L.L.P.

[57] ABSTRACT

An end cover for detachable connection on the end of a cylindrical shaped food roll. The end cover has an end plate with an external side that displays information such as advertising or marketing indicia. A retaining member extends from the end plate and forms an interference fit with the external surface of the food roll when the end cover is installed onto the food roll.

26 Claims, 4 Drawing Sheets

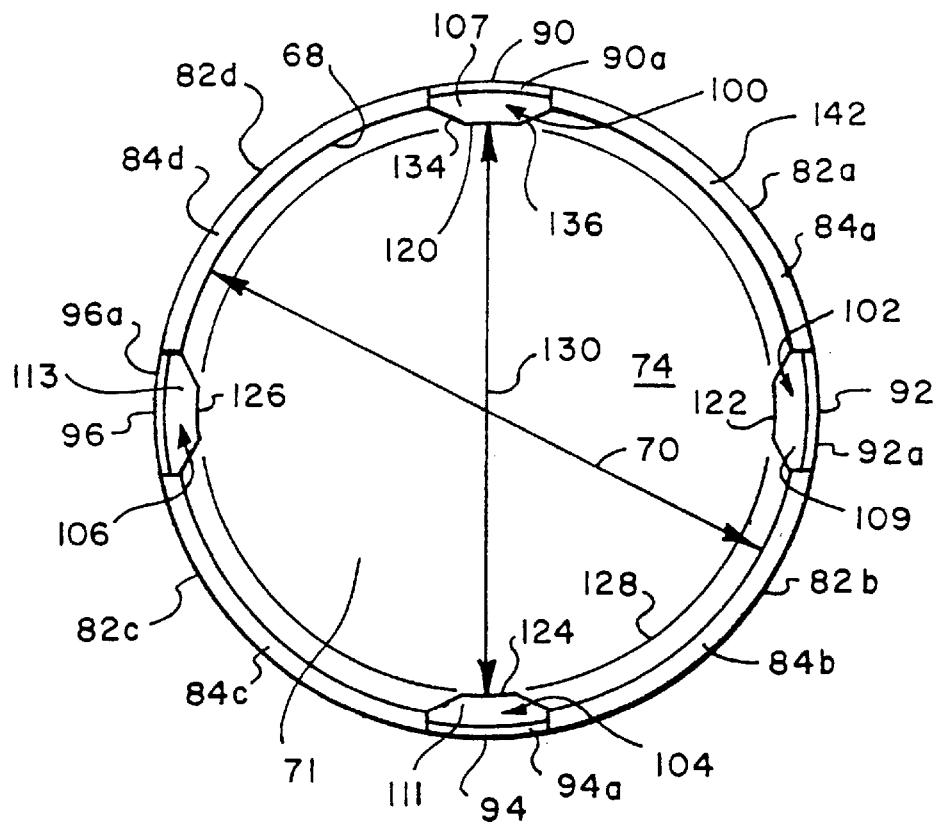
FIG. 2
FIG. 3A
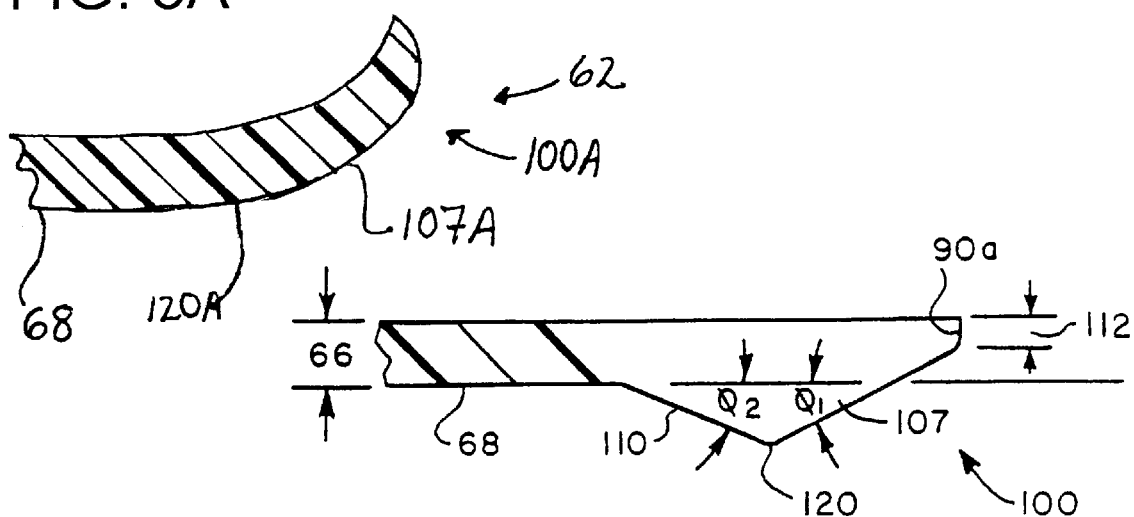
FIG. 3

REMOVABLE END COVER FOR FOOD ROLLS

CROSS-REFERENCE TO RELATED APPLICATION

This application is a Continuation-in-Part of U.S. patent application Ser. No. 09/215,104 filed on Dec. 18, 1998, now U.S. Pat. No. 6,044,757.

FIELD OF THE INVENTION

The present invention relates to covers for food items. More particularly, the present invention relates to a reusable cover that can be placed on the end of a food roll for the purpose of displaying advertising indicia, and/or for covering the end of the food roll after it has been opened.

BACKGROUND OF THE INVENTION

A number of food items are packaged and sold in cylindrical-shaped rolls, including raw or cooked sausage and other meats, cookie dough, and the like. The dimensions of food rolls can vary from one product to the next, but regardless of these dimensional variations, most food rolls, when sold, will have a uniform circular cross section over most of their length and rounded or tapered ends.

Food rolls are usually encased in unitary, throw-away plastic packages. The external surface of a food roll package generally displays information pertaining to the maker of the food product, ingredients of the food product, expiration or freshness dates, etc. However, the rounded ends of food rolls are generally not well suited for displaying such information, or other information such as advertising and marketing indicia. Consequently, a need exists for a device that can be used on the ends of food rolls for displaying information.

Food rolls often come in packages that contain more food material than will be consumed at one time. The buyer of such a food roll will usually cut off a portion of the food roll for immediate use, and save the remainder of the food roll for later use. The saved portion of the food roll is left with an open end that exposes the food item in the food roll to the environment outside of the package. These packages generally do not include a closure means that can be used to seal off and protect the exposed end of the food roll, so the consumer must provide his or her own means for sealing the end of the food roll, such as aluminum foil or plastic wraps that are commonly available in grocery stores. The use of such items on a repetitive basis may be undesirable to many people, who would prefer to accomplish this task by means of a reusable cover.

From the foregoing, it is seen that a need exists for a reusable cover that can be installed onto the ends of food rolls, for the purpose of displaying information such as marketing and advertising indicia, and/or for the purpose of minimizing the exposure of an opened end of a food roll to the environment.

SUMMARY OF THE INVENTION

The present invention provides an end cover that can be detachably connected to both the opened and unopened end of a food roll of a predetermined size, including a predetermined food roll diameter or other cross dimension, for the purpose of displaying information at an end of the food roll and for limiting the exposure of an opened end of the food roll to the environment.

The end cover includes an end plate with an external side adapted to display information such as marketing indicia, an internal side, and a thickness therebetween. A retaining member having a proximal end connected to the end plate extends away from the internal side to a distal entry end that is adapted to receive an end of the food roll.

The retaining member has an inside surface that provides an internal volume with a volume length and a cross sectional area that is sufficient to accommodate at least a portion of the length of the food roll. The cross sectional area may be substantially uniform along the volume length, or alternatively my increase and/or decrease along the volume length. At least one gripping surface is positioned on the inside surface to resiliently bear against and apply force to an external surface of the food roll, and the retaining member has at least one other surface adapted to apply force to an external surface of the food roll, when the food roll is inserted into the volume through the distal entry end.

According to another aspect of the invention, the end plate includes an indicia surface that is recessed within the thickness of the end plate an inset distance from the external side.

According to another aspect of the invention, a label adapted to display advertising information is connected to or otherwise formed on the indicia surface, and the label has a thickness that is less than the inset distance.

According to another aspect of the invention, the retaining member comprises a tubular portion at the proximal end, with a tube length extending from the proximal end towards the distal entry end.

According to another aspect of the invention, the retaining member comprises one or more resilient beam members extending from the tubular portion towards the distal entry end. A gripping surface is positioned on each beam member to resiliently bear against an external surface of the food roll to bias the food roll into contact with a portion of the inside surface found on the tubular portion.

According to another aspect of the invention, the beam members are evenly spaced on a circumference of the retaining member.

According to another aspect of the invention, the resilient beam members each include a gripping member with a gripping surface found thereon that extends from the beam members towards a central axis of the end cover. The gripping surfaces are positioned on a gripping circumference with a gripping diameter that is less than the predetermined diameter of the food roll, so that when the end cover is installed upon an end of the food roll, the gripping surfaces resiliently bear against an external surface of the food roll to retain the end cover on the food roll.

According to another aspect of the invention, at least one of the gripping members has a forward sloped surface extending from the beam member to the gripping surface, that faces the distal entry end of the retaining member.

According to another aspect of the invention, at least one of the gripping members has at least two sloped surfaces extending from the resilient beam member to the gripping surface.

According to another aspect of the invention, the retaining member comprises a unitary elastic sleeve, having an inside surface with a cross dimension that is less than the predetermined cross dimension of the food roll, and that is elastically expandable to at least the predetermined cross dimension of the food roll, so that when the elastic sleeve is placed over an end of the food roll, the inside surface encircles at least a portion of a length of the food roll and applies force to an external surface of the food roll to retain the end cover on the food roll.

According to another aspect of the invention, the distal entry end of the elastic sleeve terminates in a lip.

BRIEF DESCRIPTION OF THE DRAWINGS

FIG. 2 is an end view of the end cover embodiment shown in FIG. 1.

FIG. 3 is an enlarged detail view of a gripping surface for the end cover.

FIG. 3A is an enlarged detail view of a gripping surface according to a further embodiment of the invention.

DETAILED DESCRIPTION OF THE PREFERRED EMBODIMENTS

Figure 1:
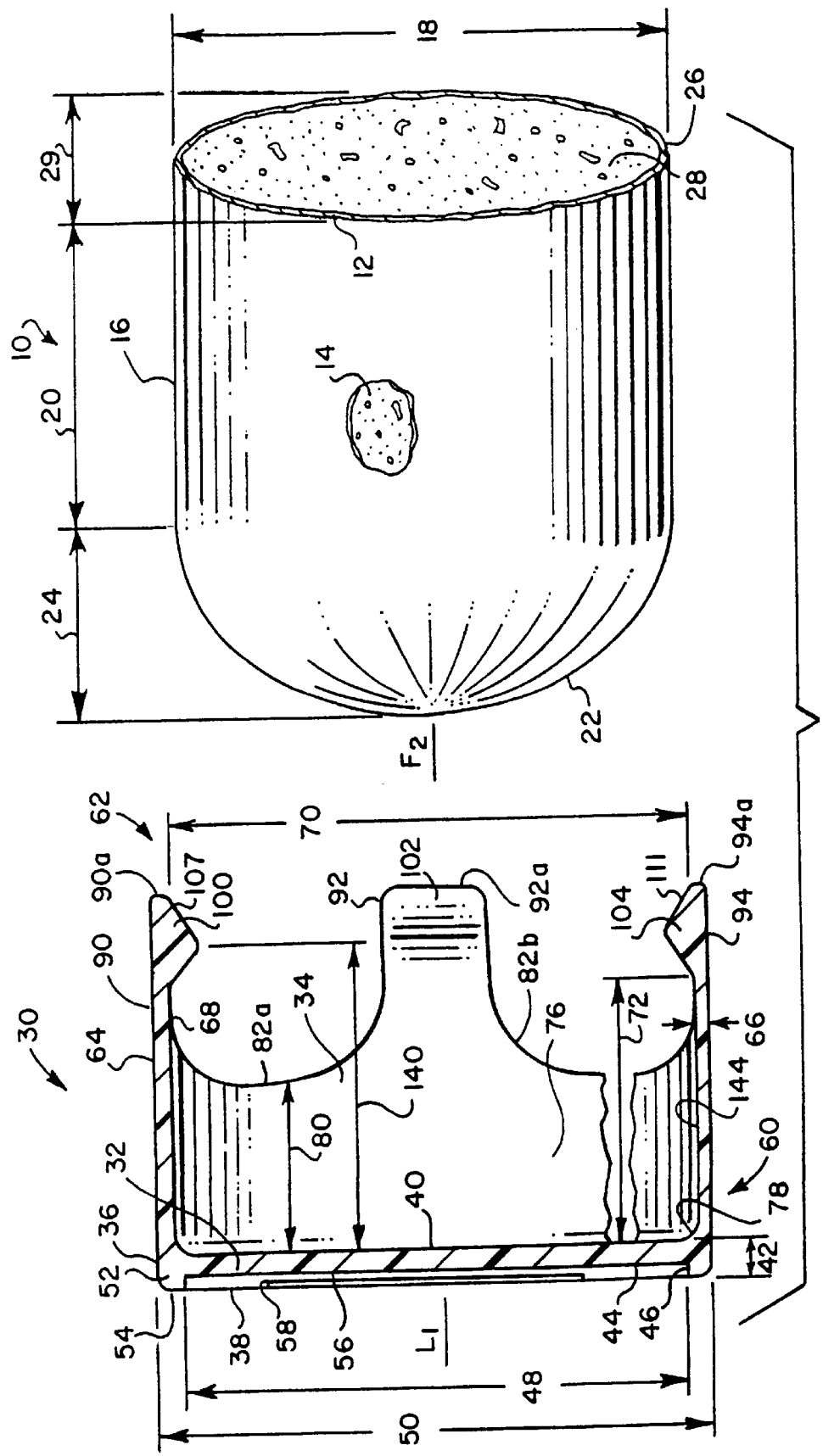
FIG. 1 is a side elevation sectional view of an end cover according to a first embodiment of the invention together with a food roll having opened and unopened ends.

With reference now to the drawings, and to FIG. 1 in particular, a cylindrical food roll (10) is illustrated. The food roll (10) includes a unitary throw-away package (12) made from a plastic or other suitable material that is filled with a food item (14) such as sausage, other types of meats, cookie dough, or the like.

The package has an external surface (16) and a substantially uniform, predetermined diameter (18) over a major length portion (20). End (22) is rounded, with a predetermined length (24) and is typical of the end configuration of a food roll as it is sold in grocery stores. End (26) is shown in a configuration where a portion of the food roll and package have been cut off and removed by the consumer, leaving a portion (28) of the food item exposed to the environment. The cut or opened end (26) of the food roll will usually have a length (29), since most consumers will not cut the food roll at a precise right angle to the central axis $F_2$ of the food roll. Such length will of course vary from one opened end to the next, depending upon how the food roll is cut by the consumer.

An end cover (30) adapted for detachable engagement with both the opened and unopened end of a food roll is shown in FIG. 1. It is to be understood that the end covers described herein are not limited to a particular size, and that their dimensions can vary as needed to accommodate a food roll of a predetermined size and diameter. The end cover (30) illustrated in FIG. 1 is preferably a unitary item made from high density polyethylene, but may alternatively be made from a polypropylene homopolymer, stainless steel, elastomer, or other suitable material approved for use with consumables.

The end cover (30) includes an end plate (32) and a retaining member (34). The end plate (32) has a circumference surface (36), an external side (38) adapted to display information, an internal side (40), and a thickness (42).

The end plate (32) includes an indicia surface (44) that displays advertising or other types of information (not shown). The indicia surface is preferably, but not necessarily, recessed into the thickness (42) by an inset distance (46) as measured from the external side. The indicia surface has a diameter (48) that is less than the diameter (50) of the end plate. The respective diameters (50) and (48) of the end plate and indicia surface are selected as desired to provide a bead (52) with a shield surface (54) on the external side (38) adjacent the circumference surface (36).

Although the end plate (32) is represented in the drawings as substantially planar, it is to be understood that the end plate may be semi-spherical in shape, oval, or of some other shape to approximate the shape of the rounded end (22) of the food roll (10). Alternatively, the external side (38) and/or internal side (40) may be straight, concave, convex, or combinations thereof, and the thickness of the end plate may vary from one area to another.

An adhesive-backed label (56) having a thickness (58), and bearing information such as marketing or advertising indicia (not shown), is connected to the indicia surface (44). The label thickness (58) can be less than the inset distance (46), and if so, the label (56) will lie completely within the thickness (42) of the end plate (32) and not protrude beyond the shield surface portion (54) of external side (38). Consequently, any such labels will be shielded to some extent from damage during handling, packaging, shipment, etc, by the shield surface (54).

In an alternative arrangement, the indicia may be printed, stamped, raised, depressed, or otherwise formed on the external side (38) and/or internal side (40), with or without the recess defined by the inset distance 46.

Retaining member (34) has a proximal end (60) connected to the end plate (32), and extends away from the internal side (40) to a distal entry end (62) that is adapted to receive ends (22) and (26) of the food roll. The retaining member includes an external surface (64), a wall thickness (66), and an inside surface (68). As seen in FIG. 2, the inside surface (68) has an internal diameter (70) and a circular cross sectional area (71). Diameter (70) is selected to be slightly larger than the diameter (18) of food roll (10). The inside surface (68) has a length portion (72) that, together with the circular cross sectional area (71), provides an internal volume (74) within the retaining member sufficient to accommodate a desired length of the food roll.

The proximal end (60) includes a tubular portion (76) that is connected by a radiused corner (78) to the internal side (40) of the end plate (32). The tubular portion has a tube length (80) extending from the internal side (40) part way towards the distal entry end (62) to rounded tube ends (82a), (82b), (82c), and (82d). Each of the rounded tube ends (82a–82d) includes a chamfered surface (84a), (84b), (84c), and (84d), respectively, that slopes inward towards the central longitudinal axis $L_1$ of the end cover (30), with the degree of the chamfer preferably being 45 degrees. Providing a chamfer on these edges can facilitate the installation of the end cover onto a food roll by minimizing the possibility of snags between the food roll and rounded ends (82a), (82b), (82c) and (82d).

Resilient beam members (90), (92), (94) and (96) are connected to and extend away from the rounded tube ends (82a), (82b), (82c), and (82d), towards the distal entry end (62). Each of the resilient beam members (90–96) terminates at a flat tip surface (90a), (92a), (94a) and (96a), respectively. Each of the resilient beam members (90–96) also includes gripping members (100), (102), (104), and (106), respectively, that extend from the inside surface (68) towards central axis $L_1$.

The construction of gripping member (100) is shown in greater detail in FIG. 3, and is typical of the construction of the other gripping members (102), (104) and (106). Gripping member (100) includes a forward sloped surface (107) facing the distal entry end (62) and a reverse sloped surface (110) facing the end plate (32). The similarly constructed gripping members (102), (104) and (106) have forward sloping surfaces (109), (111) and (113), respectively. The forward and reverse sloped surfaces are positioned at angles $\phi_1$ and $\phi_2$, respectively, with respect to inside surface (68), and in the preferred embodiment, the angles $\phi_1$ and $\phi_2$ are each thirty degrees. The forward sloped surface (107) extends into the flat tip surface (90a), which has a thickness (112) that is less than the wall thickness (66) of the retaining member (34).

The forward and reverse sloped surfaces (107) and (110) meet at gripping surface (120). Referring to FIG. 2, the gripping surfaces (120), (122), (124), and (126) are shown positioned along a gripping circumference (128) having a gripping diameter (130), which is selected to be slightly less than the diameter (18) of the food roll (10). As seen in FIG. 2, sides (134) and (136) of gripping member (100) are sloped, and the degree of the slope may be selected as desired to vary the size of the gripping surface (120). The other gripping members (102, 104) and (106) may also be provided with sloped side surfaces.

The gripping surfaces (120), (122), (124), and (126) are positioned a distance (140) from internal side (40) of end plate (32). Distance (140) is selected to ensure that the gripping surfaces will be positioned on and resiliently bear against the major length portion (20) of the food roll (10) when the end cover is fully installed onto unopened end (22) of the food roll. In other words, the distance (140) will be longer than the predetermined length (24) of the rounded end (22) of the food roll on which the cap will be used.

Beam members (90), (92), (94), and (96) are evenly spaced at 90° along the circumference (128) of the retaining member (34), which evenly spaces the gripping surfaces (120), (122), (124), and (126) along the gripping circumference (128). One skilled in the art will recognize that the retaining member (34) may comprise one or more beam members. If more than one beam member is used, the beam members are preferably evenly spaced along the retaining member circumference (142) so that the gripping surfaces found on the beam portions will evenly apply loads to the food roll.

A retaining member (34) may also be constructed with a single resilient beam member. For example, the retaining member could be provided with a single resilient beam member (90) and gripping surface (120). When the end cover (30) is fully installed onto the food roll (10), the gripping surface (120) will resiliently bear against and apply force to the external surface (16) of the food roll (10). The food roll will be biased into a portion (144) of the inside surface (68) on the tubular portion (76), which will apply an opposing force to the external surface (16) of the food roll.

Figure 1A:
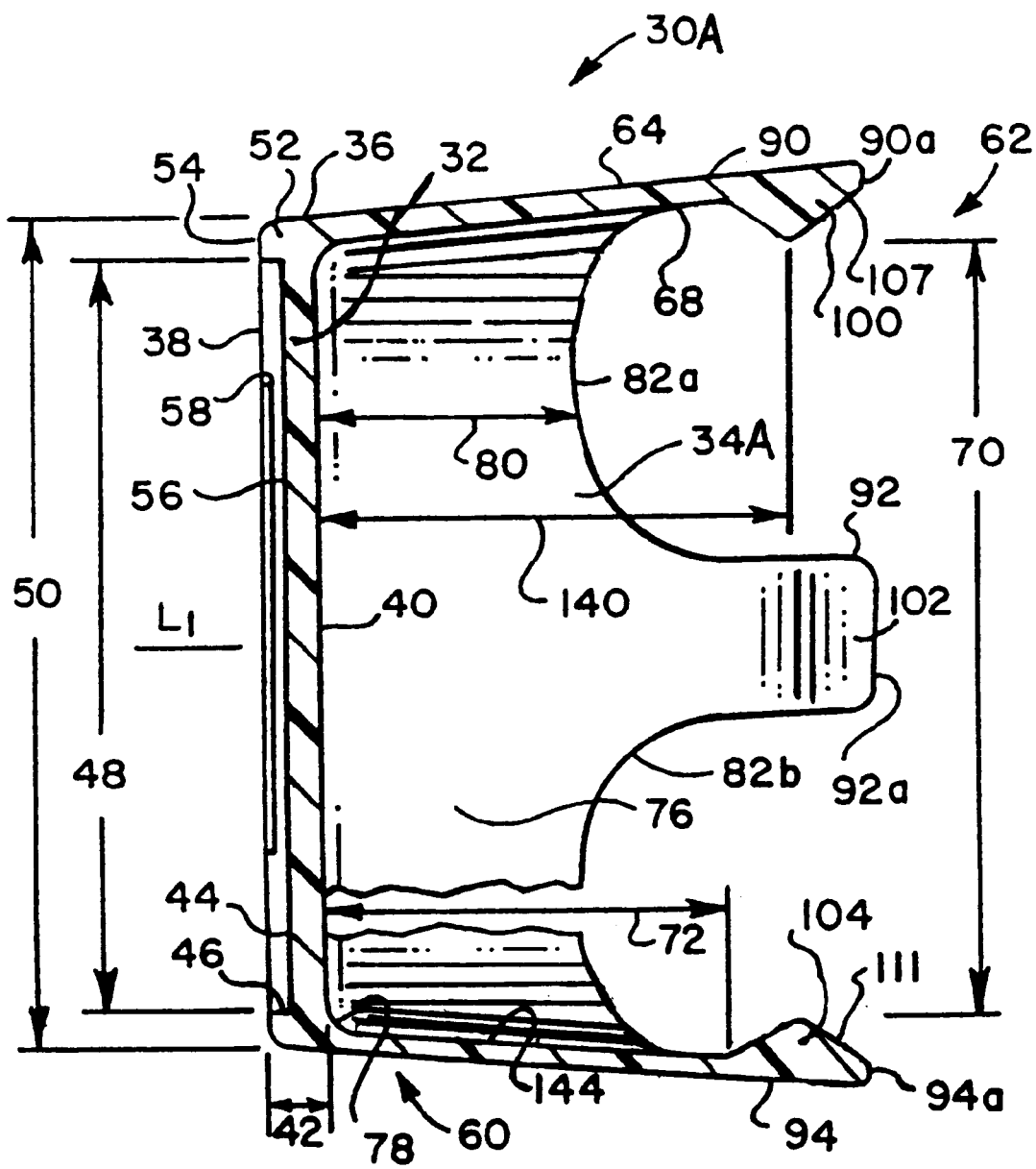
FIG. 1A is a side elevation sectional view of an end cover according to a second embodiment of the invention.

Referring now to FIG. 1A, an end cover (30A) according to a second embodiment of the invention is illustrated, wherein like parts in the previous embodiment are represented by like numerals. The end cover (30A) is similar in construction to the end cover (30), with the exception that the retaining member (34A) slopes generally outwardly with respect to the axis $L_1$ of the end cover (30) from the end plate (32). In this manner, the circular cross sectional area 71 (FIG. 2) of the retaining member (34A) gradually increases from the internal side (40) toward the distal entry end (62) to form a generally frusto-conical internal volume for receiving the food roll (10). The frusto-conical volume of the sloped end cover (30A) can accommodate food rolls with varying diameters.

In each of the above embodiments, one or more of the gripping members (100–106) may be modified, such as shown in FIG. 3A, to form a gripping surface (120A) that is flush with the inside surface (68) of the retaining member (34). A surface (107A) extends from the gripping surface (120A) and faces the distal entry end (62). The surface (107A) curves or slopes outwardly away from the axis $L_1$ (FIG. 1). Preferably, an inner diameter or cross dimension defined by the curved surfaces 107(A) of the gripping members is greater than an outer diameter or cross dimension of a food roll. In this manner, the end cover (30, 30A) may be easily installed over an end of a food roll by engaging the surfaces (107A) to spread the gripping members apart. Preferably, the flush gripping surfaces (120A) of the beam members will resiliently bear against and apply force to the external surface (16) of the food roll (10).

Figure 4:
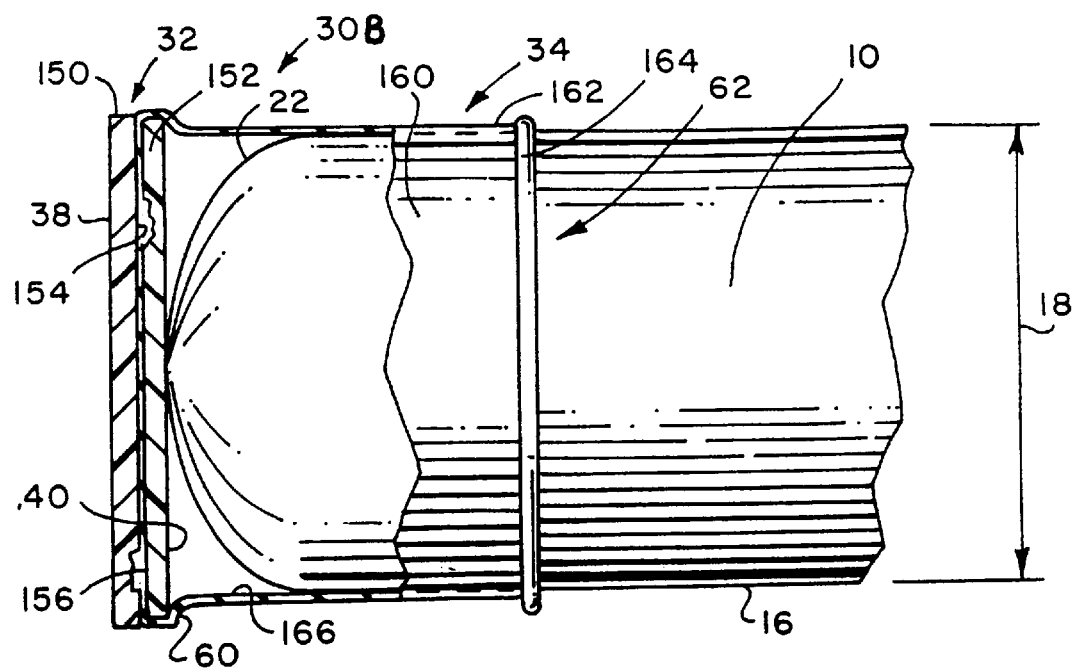
FIG. 4 is a side elevation view in partial cross section of an end cover according to a third embodiment of the invention, and installed on an unopened end of a food roll.

With reference now to FIG. 4, an end cover (30B) according to a third embodiment of the invention is illustrated, wherein like parts in the previous embodiments are represented by like numerals. The end cover (30B) is shown installed on the rounded end (22) of the food roll (10). In this embodiment, the end plate (32) is a two-piece member having a first plate (150) and a second plate (152). The first plate (150) includes an external side (38) that is adapted to display information, a first plate faying surface (154), and can have a recessed indicia surface (not shown) and label (not shown) of the same configuration as that shown on the embodiment depicted in FIG. 1. The second plate (152) includes an internal side (40) and a second plate faying surface (156). Each of the plates are preferably made from an acrylic plastic, but may alternatively be made from a polypropylene homopolymer, stainless steel, elastomer, or other suitable material approved for use with consumables.

The retaining member (34) comprises a unitary, elastic sleeve (160) with a proximal end (60) joined to the end plate (32). The proximal end (60) is positioned between the faying surfaces (154) and (156), and the faying surfaces and proximal end (60) are permanently joined together using means known to those skilled in the art, such as bonding with epoxy adhesives.

The elastic sleeve (160) extends from the internal side (40) for a sleeve length (162) to distal entry end (62) and terminates in a lip (164). The lip provides structural strength to the end of the sleeve, and, as later described, is used to facilitate the installation of the end cover onto the food roll.

The sleeve (160) has an internal surface (166) with a relaxed diameter (not shown) that is less than the predetermined diameter (18) of the food roll (10) and that is preferably substantially continuous for the sleeve length (162). Alternatively, the elastic sleeve may be outwardly or inwardly sloping from the retaining member (34), ribbed, or of any other shape for holding the end cover (30B) on the food roll (10). The sleeve (160) is preferably made from a material such as latex that has the degree of elasticity necessary to permit the sleeve to expand to predetermined food roll diameter (18) when the end cover (30B) is installed onto the food roll. Although latex is preferred, it is to be understood that other elastomeric or stretchable materials may be used to form the sleeve (160). The sleeve length (162) is longer than the predetermined end length (24) on the food roll, to ensure that at least a portion of the inside surface (166) will be positioned against the major length (20) when the end cover is installed onto the food roll.

The operation of placing an end cover (30 or 30A) on the rounded end (22) of the food roll will now be described with respect to FIGS. 1, 1A and 2. The end cover (30 or 30A) is positioned near the end (22) with the central axis ($F_1$) of the food roll in substantial alignment with the central axis ($L_2$) of the end cover. The end cover is moved towards the end of the food roll, whereupon the external surface (16) of the food roll contacts the forward sloped surfaces (107), (109), (111) and (113).

As the end cover continues to move onto the food roll, the resilient beam members (90), (92), (94) and (96) flex outward relative to the central axis ($L_1$) of the end cover and gripping surfaces (120), (122), (124) and (126) ride up the rounded end (22) onto the major length (20). The end cover is moved further in this direction until its internal side (40) rests against the end (22) of the food roll. In this position, the gripping surfaces and the food roll external surface form an interference fit, and the gripping surfaces resiliently bear against and apply force to the external surface to retain the cover on the food roll.

Figure 5:
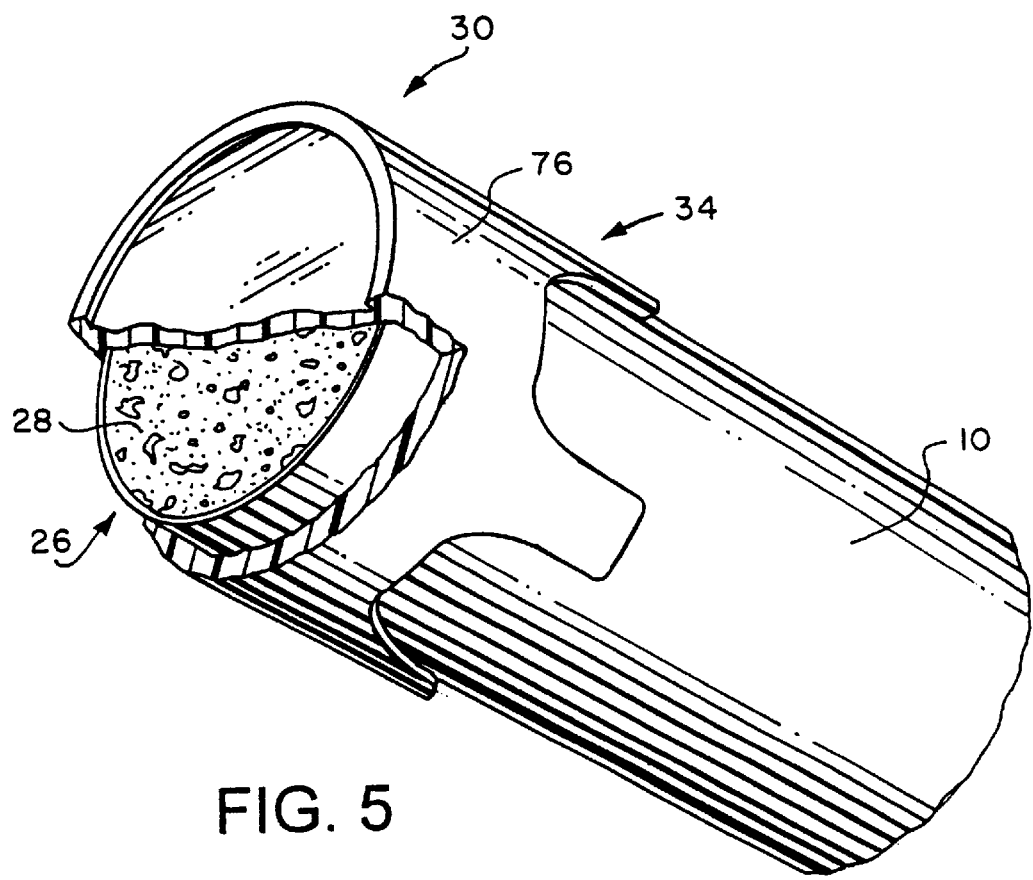
FIG. 5 is a perspective view of the end cover embodiment shown in FIG. 1, partially broken away, installed on an opened end of a food roll.

The end cover (30, 30A) is shown fully installed onto opened end (26) of a food roll (10) in FIG. 5. The end cover is installed onto the opened end in the same way as it is installed onto the rounded end of the food roll. A consumer who wishes to use the end cover on the opened end can cut the food roll in a manner that will minimize the length (29) of end (26). By minimizing this length, a consumer can ensure that exposed portion (28) of the food item lies within the tubular portion (76) of the retaining member (34) to limit its exposure to the environment.

To use the alternative embodiment shown in FIG. 4, the user will grasp the lip (164) on the elastic sleeve and roll it up towards end plate (32) to reduce the length of the sleeve. After the length of the sleeve is reduced, the sleeve is stretched open and placed over the end (22) of the food roll. The sleeve is then unrolled to its full length, which positions the inside surface (166) against the external surface (16) of the food roll. Since the elastic sleeve (160) is now expanded from its relaxed diameter, the inside surface (166) encircling the food roll will form an interference fit with the external surface (16) and apply force to the external surface (16) to retain the end cover on the food roll.

The same procedure can be used to install the end cover onto the opened end of a food roll. A consumer who wishes to use the end cover in this manner can cut the food roll to minimize the length (29) of the opened end, to ensure that the inside surface (166) contacts and grips at least a portion of the major length (20) on the food roll.

Although the above embodiments have been described for use with a cylindrical-shaped food roll, it is to be understood that the end cover can be shaped to accommodate food rolls of other cross sectional shapes.

While the preferred embodiments of the claims have been described, it should be understood that various changes, adaptations, and modifications may be made thereon without departing from the spirit of the invention and the scope of the appended claims.

What is claimed is:

1. An end cover for detachable connection to at least one of an opened and unopened end of a food roll, the end cover comprising:
    a) an end plate having an external side and an internal side;
    b) a retaining member having a proximal end connected to said end plate and a distal entry end spaced from said end plate;
    c) said retaining member further having an inside surface that provides an internal volume, the internal volume being sufficient to receive at least a portion of the food roll; and
    d) said retaining member further having at least one resiliently biased gripping member associated with said retaining member to resiliently bear against and apply force to an external surface of the food roll when the food roll is inserted into said volume through said distal entry end to thereby retain said end cover on the food roll.

2. An end cover as claimed in claim 1, and further comprising a display surface associated with said external side, said display surface being adapted to display information.

3. An end cover as claimed in claim 1, wherein said retaining member further comprises a tubular portion with at least a part of said inside surface, said tubular portion being located at said proximal end and having a tube length that extends from said proximal end towards said distal entry end.

4. An end cover as claimed in claim 3, wherein said retaining member further comprises a resilient beam member extending from said tubular portion towards said distal entry end, and said gripping member being positioned on said beam member to resiliently bear against the external surface of the food roll.

5. An end cover as claimed in claim 4, and further comprising a display surface associated with said external side, said display surface being adapted to display information.

6. An end cover as claimed in claim 4, wherein said gripping member comprising a gripping surface that is adapted to contact an outer surface of the food roll.

7. An end cover as claimed in claim 6, wherein said gripping member further comprises a forward sloped surface extending from said beam member to said gripping surface, the forward sloped surface facing said distal entry end of said retaining member.

8. An end cover as claimed in claim 7, wherein said gripping member further comprises a rearward sloped surface extending from said beam member to said gripping surface, said rearward sloped surface facing said proximal end of said retaining member.

9. An end cover as claimed in claim 1, wherein said retaining member comprises a plurality of resilient beam members extending from said proximal end towards said distal entry end, with said at least one gripping member being positioned on each of said beam members to resiliently bear against the external surface of the food roll.

10. An end cover as claimed in claim 9, wherein said beam members are evenly spaced on a circumference of said retaining member.

11. An end cover as claimed in claim 10, and further comprising a display surface associated with said external side, said display surface being adapted to display information.

12. An end cover as claimed in claim 1, wherein a cross sectional area of said internal volume is substantially uniform along a length of said internal volume.

13. An end cover as claimed in claim 1, wherein a cross sectional area of said internal volume increases from said end plate toward said distal entry end.

14. An end cover as claimed in claim 1, wherein said gripping member includes a gripping surface that is flush with said inside surface.

15. An end cover as claimed in claim 14, wherein a distal end of said gripping surface curves generally outwardly and away from a central axis of said end plate at said distal entry end.

16. An end cover for detachable connection to one of an opened and unopened end of a cylindrical food roll, for limiting the exposure of an opened end of the food roll to the environment, comprising:

a) an end plate having an external side and an internal side;

b) a retaining member having a proximal end connected to said end plate and a distal entry end spaced from said end plate;

c) said retaining member including a tubular portion extending from said proximal end partway to said distal end, said tubular portion having an inner volume sufficient to receive at least a portion of the food roll;

e) a plurality of resilient beam members extending from said tubular portion towards said distal entry end, each said beam member having a gripping member with a gripping surface, said gripping surfaces being positioned on a gripping circumference with a gripping diameter that is less than the predetermined diameter of the food roll, whereby, when the end cover is installed upon an end of the food roll, said gripping surfaces resiliently bear against an external surface of the food roll to retain the end cover on the food roll.

17. An end cover as claimed in claim 16, wherein at least one of said gripping members has a forward sloped surface extending from its associated beam member to its associated gripping surface, said forward sloped surface facing said distal entry end of said retaining member.

18. An end cover as claimed in claim 17, wherein said at least one gripping member has a rearward sloped surface extending from its associated beam member to its associated gripping surface, said rearward sloped surface facing said proximal end of said retaining member.

19. An end cover as claimed in claim 16, and further comprising a display surface associated with said external side, said display surface being adapted to display information.

20. An end cover as claimed in claim 16, wherein a cross sectional area of said inner volume is substantially uniform along a length of said inner volume.

21. An end cover as claimed in claim 16, wherein a cross sectional area of said internal volume increases from said end plate toward said distal entry end.

22. An end cover as claimed in claim 16, wherein at least one of said gripping surfaces is flush with an inside surface of its associated beam member.

23. An end cover as claimed in claim 22, wherein a distal end of said at least one gripping surface curves generally outwardly and away from the central axis of said end cover at said distal entry end.

24. An end cover for detachable connection to one of an opened and unopened end of a food roll having a predetermined cross dimension, the end cover comprising:

a. an end plate having an external side adapted to display information and an internal side;

b. a retaining member having a proximal end connected to said end plate and a distal entry end spaced from said proximal end;

c. said retaining member comprising a unitary elastic sleeve, having an inside surface with a cross dimension that is less than the predetermined cross dimension of the food roll, said elastic sleeve being elastically expandable to at least the predetermined cross dimension of the food roll; whereby, when said elastic sleeve is placed over an end of the food roll, said inside surface encircles at least a portion of a length of the food roll and applies force to an external surface of the food roll to retain the end cover on the food roll.

25. An end cover as claimed in claim 24, wherein said distal entry end of said elastic sleeve terminates in a lip.

26. An end cover as claimed in claim 24, and further comprising a display surface associated with said external side, said display surface being adapted to display information.

\* \* \* \* \*